United States Patent
He

(10) Patent No.: US 12,146,694 B2
(45) Date of Patent: Nov. 19, 2024

(54) ELECTRONIC EXPANSION VALVE

(71) Applicant: ZHEJIANG DUNAN ARTIFICIAL ENVIRONMENT CO., LTD., Zhejiang (CN)

(72) Inventor: Yuchen He, Zhejiang (CN)

(73) Assignee: ZHEJIANG DUNAN ARTIFICIAL ENVIRONMENT CO., LTD., Zhejiang (CN)

( * ) Notice: Subject to any disclaimer, the term of this patent is extended or adjusted under 35 U.S.C. 154(b) by 287 days.

(21) Appl. No.: 17/610,163

(22) PCT Filed: May 13, 2020

(86) PCT No.: PCT/CN2020/090040
§ 371 (c)(1),
(2) Date: Nov. 10, 2021

(87) PCT Pub. No.: WO2020/248760
PCT Pub. Date: Dec. 17, 2020

(65) Prior Publication Data
US 2022/0228784 A1 Jul. 21, 2022

(30) Foreign Application Priority Data

Jun. 12, 2019 (CN) .......................... 201910508067.9

(51) Int. Cl.
*F25B 41/35* (2021.01)
*F16K 39/02* (2006.01)

(52) U.S. Cl.
CPC ............ *F25B 41/35* (2021.01); *F16K 39/022* (2013.01)

(58) Field of Classification Search
CPC ...... F25B 41/31; F25B 41/32; F25B 2341/06; F25B 2341/063; F25B 2341/064;
(Continued)

(56) References Cited

U.S. PATENT DOCUMENTS

| 4,164,959 A | * | 8/1979 | Wurzburger | ............ F16K 39/02 137/553 |
| 2010/0181514 A1 | * | 7/2010 | Ohuchi | ................. F16K 31/047 251/284 |

FOREIGN PATENT DOCUMENTS

| CN | 202493696 U | 10/2012 |
| CN | 106151552 A | 11/2016 |

(Continued)

OTHER PUBLICATIONS

WO-2020170721-A1 English Translation (Year: 2020).*
(Continued)

*Primary Examiner* — Frantz F Jules
*Assistant Examiner* — Devon Moore
(74) *Attorney, Agent, or Firm* — Samson G. Yu

(57) ABSTRACT

An electronic expansion valve, the electronic expansion valve includes: a housing (10), wherein the housing (10) is provided with an accommodating cavity (11) and a valve cavity (12), the valve cavity (12) is used for communicating with a pipeline, the housing (10) includes a valve seat (14), and the valve cavity (12) is disposed in the valve seat (14); a valve core assembly (20), movably disposed in the housing (10); and a guide seat (30), wherein the guide seat (30) is located between the accommodating cavity (11) and the valve cavity (12), a balance channel (40) is provided between the guide seat (30) and the valve seat (14), one end of the balance channel (40) is in communication with the accommodating cavity (11), and the other end of the balance channel (40) is in communication with the valve cavity (12).

6 Claims, 5 Drawing Sheets

(58) Field of Classification Search
CPC .. F25B 2341/067; F16K 39/022; F16K 39/02; F16K 47/08
See application file for complete search history.

(56) References Cited

FOREIGN PATENT DOCUMENTS

| | | | |
|---|---|---|---|
| CN | 108662169 A | 10/2018 | |
| CN | 210123018 U | 3/2020 | |
| JP | S6018574 A | 2/1985 | |
| JP | H0463104 A | 5/1992 | |
| JP | H09225710 A | 9/1997 | |
| JP | H09317922 A | 12/1997 | |
| JP | 2010043727 A | 2/2010 | |
| JP | 2016153673 A | 8/2016 | |
| WO | 2018137636 A1 | 8/2018 | |
| WO | WO-2019091484 A1 * | 5/2019 | ............... F16K 1/02 |
| WO | WO-2020170721 A1 * | 8/2020 | ......... F16K 27/0254 |

OTHER PUBLICATIONS

WO-2019091484-A1 English Translation (Year: 2019).*
CN-106151552-A English Translation (Year: 2016).*
The First Office action of counterpart JP application No. 2021549654.
The Office action of counterpart KR application No. 20217036776.

* cited by examiner

ELECTRONIC EXPANSION VALVE

CROSS-REFERENCE TO RELATED APPLICATION

The present disclosure claims priority to Chinese patent application No. 201910508067.9, titled "Electronic Expansion Valve", and filed to China National Intellectual Property Administration on Jun. 12, 2019.

TECHNICAL FIELD

The present disclosure relates to the technical field of electronic expansion valves, and in particular, to an electronic expansion valve.

BACKGROUND

At present, an electronic expansion valve includes a housing and a valve core assembly, the valve core assembly is disposed in a valve body. The housing includes an accommodating cavity and a valve cavity, wherein the valve cavity is used for communicating with a pipeline, and the valve core assembly moves in the housing, so as to adjust the communication situation between the valve cavity and the pipeline, thereby achieving opening and closing of the electronic expansion valve.

However, in the art known to inventors, the accommodating cavity is not in communication with the valve cavity, and when the valve core assembly is used to open or close the electronic expansion valve, a pressure difference exists between the accommodating cavity and the valve cavity, thereby affecting the action performance of the valve core assembly. Therefore, there is a problem in the art known to inventors that it is difficult to achieve rapid pressure balance.

SUMMARY

Some embodiments of the present disclosure provide an electronic expansion valve, to solve the problem in the art known to inventors that it is difficult to achieve rapid pressure balance.

Some embodiments of the present disclosure provide an electronic expansion valve, the electronic expansion valve includes: a housing, wherein the housing is provided with an accommodating cavity and a valve cavity, the accommodating cavity is spaced apart from the valve cavity, the valve cavity is used for, communicating with a pipeline, the housing includes a valve seat, and the valve cavity is disposed in the valve seat; a valve core assembly, movably disposed in the housing, wherein the valve core assembly has an open position and a blocking position, when the valve core assembly is located in the open position, the valve cavity is in a communication state, and when the valve core assembly is located in the blocking position, the valve cavity is in an isolation state; and a guide seat, disposed in the housing, wherein the guide seat is located between the accommodating cavity and the valve cavity, the valve core assembly partially penetrates into the guide seat, a balance channel is provided between the guide seat and the valve seat, one end of the balance channel is in communication with the accommodating cavity, and the other end of the balance channel is in communication with the valve cavity.

In some embodiments, the housing further includes a sleeve, the valve seat is connected with the sleeve, a mounting hole is disposed at an end, close to the sleeve, of the valve seat, the mounting hole is in communication with the interior of the sleeve to form the accommodating cavity, the valve cavity is disposed at the other end of the valve seat, and one end of the guide seat is fixedly connected with the valve seat through the mounting hole.

In some embodiments, the valve core assembly includes a nut seat and a screw penetrating into the nut seat, the other end of the guide seat is connected with the nut seat, and an outer wall of the guide seat is in transition fit or interference fit with an inner hole of the nut seat, thereby guiding the nut seat, and improving a coaxiality of the nut seat, the screw and the valve seat.

In some embodiments, the mounting hole is a stepped hole, the mounting hole includes a first hole and a second hole which are sequentially provided and have sequentially decreasing hole diameters, and the second hole is in communication with the valve cavity.

In some embodiments, a limiting boss is disposed on the outer wall of the guide seat, the limiting boss is in interference fit with the first hole, the limiting boss is used for limiting a relative position between the guide seat and the valve seat, and the guide seat penetrates into the first hole and the second hole.

In some embodiments, the balance channel includes a notch, the notch is disposed on a side wall of the limiting boss, and the accommodating cavity is in communication with the valve cavity by means of the notch.

In some embodiments, the limiting boss includes a first boss and a second boss which are disposed in a stepped manner, the first boss is disposed corresponding to the first hole, the second boss is disposed corresponding to the second hole, and the notch penetrates through the first boss and the second boss.

In some embodiments, a plurality of notches are disposed on the side wall of the guide seat, and the plurality of notches are disposed at intervals along a circumferential direction of the limiting boss.

In some embodiments, the guide seat and/or the valve seat are provided with communicating holes, one end of each communicating hole is in communication with the accommodating cavity, the other end of the each communicating hole is in communication with the valve cavity, and the communicating holes form the balance channel.

In some embodiments, the communicating hole is disposed on the limiting boss, one end of the communicating hole is in communication with the accommodating cavity, and the other end of the communicating hole is in communication with the second hole.

In some embodiments, the guide seat is provided with a plurality of communicating holes, and the plurality of communicating holes are disposed on the limiting boss at intervals along a circumferential direction of the guide seat.

By applying the technical solutions in some embodiments of the present disclosure, the electronic expansion valve includes a housing, a valve core assembly and a guide seat. The housing is provided with an accommodating cavity and a valve cavity, the valve cavity is used for communicating with a pipeline. By moving the valve core assembly between an open position and a blocking position, the valve cavity can switch between a communication state and an isolation state. In some embodiments, the guide seat is disposed between the accommodating cavity and the valve cavity, the balance channel is disposed between the guide seat and the valve seat, one end of the balance channel is in communication with the accommodating cavity, and the other end of the balance channel is in communication with the valve cavity, thereby achieving communication between the accommodating cavity and the valve cavity. When the electronic expansion valve is opened or closed, rapid pressure balance between the accommodating cavity and the valve cavity can be achieved by means of the balance channel, avoiding affecting the action performance of the valve core assembly in the expansion valve.

BRIEF DESCRIPTION OF THE DRAWINGS

The drawings of the description, constituting a part of some embodiments of the present disclosure, are used for providing further understanding to some embodiments of the present disclosure, and illustrative embodiments of the present disclosure and descriptions thereof are used for explaining some embodiments of the present disclosure, rather than constituting inappropriate limitation on some embodiments to the present disclosure. In the drawings.

Figure 1:
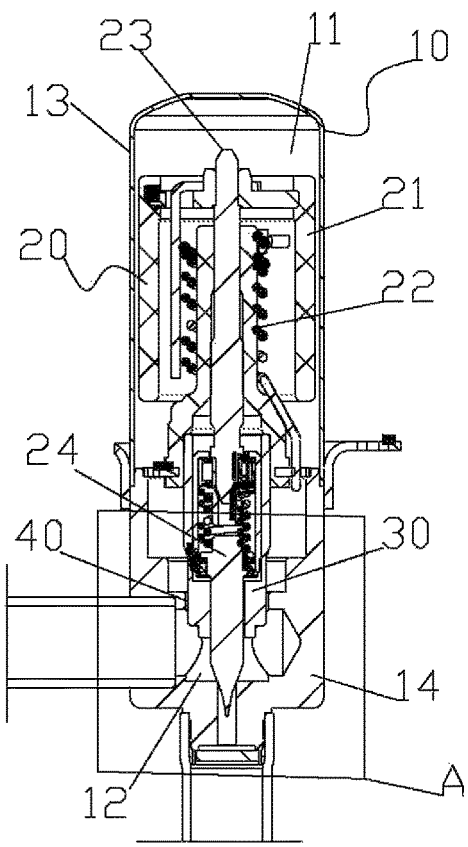
FIG. 1 is a schematic structural diagram of an electronic expansion valve according to Embodiment 1 of the present disclosure.
Figure 2:
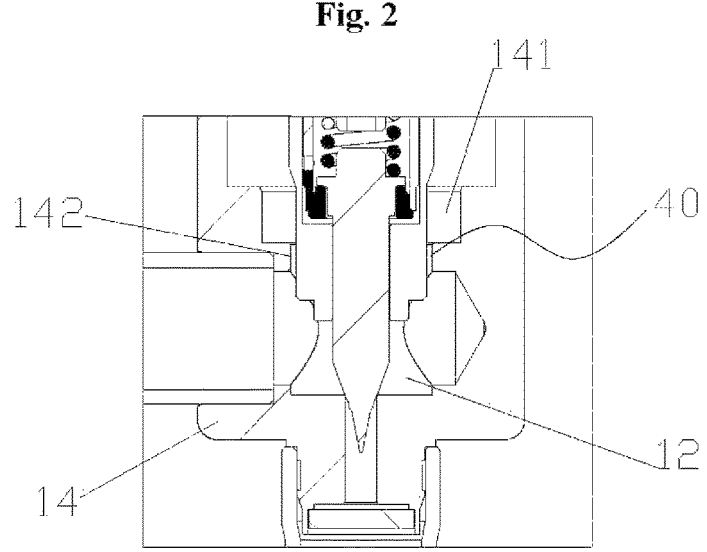
FIG. 2 is a partially enlarged view of A in FIG. 1.

Herein, the described accompanying drawings include the following reference signs:

10: housing; 11: accommodating cavity; 12: valve cavity; 13: sleeve; 14: valve seat; 141: first hole; 142: second hole;
20: valve core assembly; 21: rotor; 22: nut seat; 23: screw; 24: valve needle assembly;
30: guide seat; 31: limiting boss; 311: first boss; 312: second boss;
40: balance channel; 41: notch; 42: communicating hole.

DETAILED DESCRIPTION OF THE EMBODIMENTS

Hereinafter, the technical solutions in the embodiments of the present disclosure will be described clearly and thoroughly with reference to the accompanying drawings of the embodiments of the present disclosure. Obviously, the embodiments as described are only part of the embodiments of the present disclosure, and are not all of the embodiments. The following description of at least one exemplary embodiment is merely illustrative in nature and is in no way intended to limit some embodiments of the present disclosure and any applications or uses thereof. On the basis of the embodiments in the present disclosure, all other embodiments obtained by a person of ordinary skill in the art without inventive effort shall all belong to the scope of protection of the present disclosure.

As shown in FIGS. 1-4, Embodiment 1 of the present disclosure provides an electronic expansion valve, the electronic expansion valve includes a housing 10, a valve core assembly 20 and a guide seat 30. The housing 10 is provided with an accommodating cavity 11 and a valve cavity 12, the accommodating cavity 11 is spaced apart from the valve cavity 12, the valve cavity 12 is used for communicating with a pipeline, the housing 10 includes a valve seat 14, and the valve cavity 12 is disposed in the valve seat 14. The valve core assembly 20 is movably disposed in the housing 10, and the valve core assembly 20 has an open position and a blocking position, when the valve core assembly 20 is located in the open position, the valve cavity 12 is in a communication state, and when the valve core assembly 20 is located in the blocking position, the valve cavity 12 is in an isolation state. In this embodiment, the valve cavity 12 is connected with two pipelines; when the valve core assembly 20 is located in the open position, the two pipelines may be in communication via the valve cavity 12; and when the valve core assembly is located in the blocking position, the two pipelines are isolated by the valve cavity 12. In some embodiments, the guide seat 30 is disposed in the housing 10, and the guide seat 30 is located between the accommodating cavity 11 and the valve cavity 12. A balance channel 40 is provided between the guide seat 30 and the valve seat 14, one end of the balance channel 40 is in communication with the accommodating cavity 11, and the other end of the balance channel 40 is in communication with the valve cavity 12, thereby achieving communication between the accommodating cavity 11 and the valve cavity 12.

By applying the electronic expansion valve provided in the present embodiment, the communication between the accommodating cavity 11 and the valve cavity 12 can be achieved by providing the balance channel 40 between the accommodating cavity 11 and the valve cavity 12. When the valve core assembly 20 moves in the housing 10, so that the valve cavity 12 is switched between the communication state and the isolation state, the accommodating cavity 11 and the valve cavity 12 achieves rapid pressure balance through the balance channel 40, so that the valve core assembly 20 will not be damaged, avoiding affecting the action performance of the valve core assembly, and further improving the service life and reliability of the expansion valve.

In the present embodiment, the housing 10 further includes a sleeve 13, the valve seat 14 is partially located in the sleeve 13, and the valve seat 14 is fixedly connected with the sleeve 13. A mounting hole is disposed at the end, close to the sleeve 13, of the valve seat 14, and the guide seat 30 is fixedly connected with the valve seat 14 through the mounting hole. In some embodiments, the mounting hole is in communication with the sleeve 13 to form the accommodating cavity 11, the valve cavity 12 is disposed at the other end of the valve seat 14, the valve cavity 12 is used for communicating with pipelines, a valve port is disposed in the valve cavity 12, and the valve port is disposed at a pipe orifice of one of the pipelines.

In some embodiments, the mounting hole is a stepped hole. In the present embodiment, the mounting hole includes a first hole 141 and a second hole 142 which are sequentially provided and have sequentially decreasing hole diameters, and the second hole 142 is in communication with the valve cavity 12.

A limiting boss 31 is disposed on an outer wall of the guide seat 30. In the present embodiment, the limiting boss 31 is in interference fit with the first hole 141, so as to achieve fixed connection between the guide seat 30 and the valve seat 14, and thus a relative position between the guide seat 30 and the valve seat 14 can be limited by using the limiting boss 31. In some embodiments, the guide seat 30 penetrates into the first hole 141 and the second hole 142. In the present embodiment, the limiting boss 31 is in interference fit with at least one position of the first hole 141 and the second hole 142.

Figure 3:
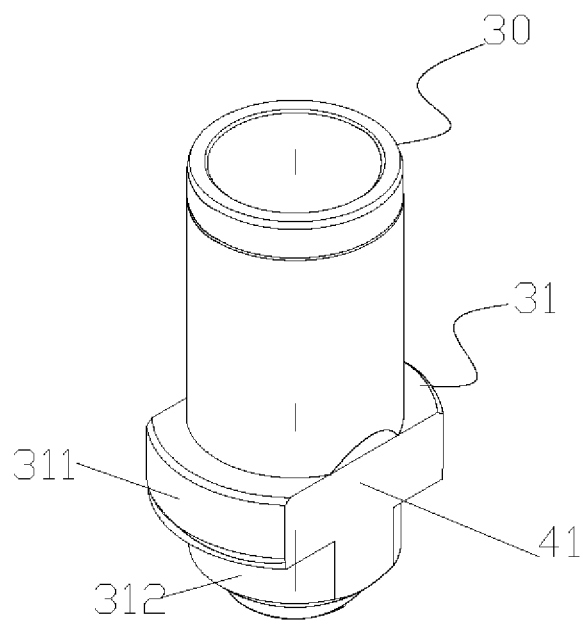
FIG. 3 is a schematic structural diagram of a guide seat in FIG. 1.
Figure 4:
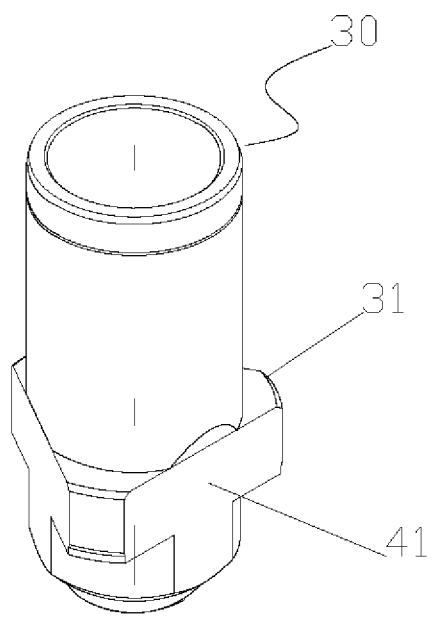
FIG. 4 is another schematic structural diagram of the guide seat in FIG. 1.
Figure 5:
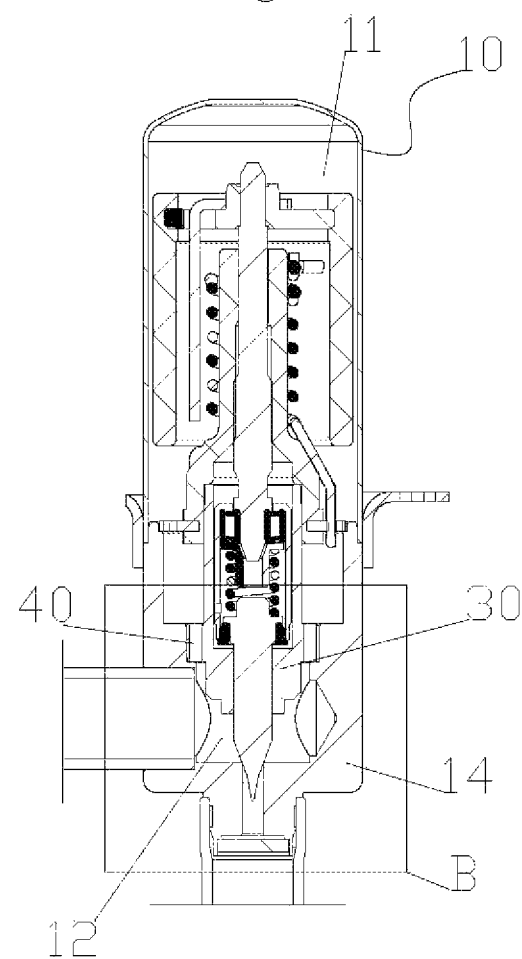
FIG. 5 is a schematic structural diagram of an electronic expansion valve according to Embodiment 2 of the present disclosure.
Figure 6:
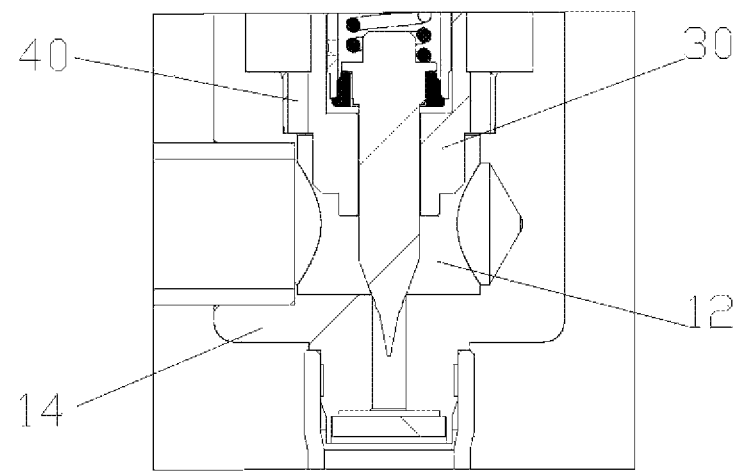
FIG. 6 is a partially enlarged view of B in FIG. 5.

As shown in FIGS. 3 and 4, the balance channel 40 includes a notch 41, the notch 41 is disposed on a side wall of the limiting boss 31. In some embodiments, one end of the notch 41 is in communication with the accommodating cavity 11, and the other end of the notch 41 is in communication with the valve cavity 12, so that the accommodating cavity 11 is in communication with the valve cavity 12 through the notch 41. In the present embodiment, the notch 41 is of cutting surface, the cutting surface is disposed on the limiting boss 31 in a penetrating manner, and a gap exists between the cutting surface and the mounting hole to form the balance channel. In some embodiments, the extension directions of the cutting surface are the same as an axial direction of the guide seat 30, that is, the balance channel 40 extend in a vertical direction, so as to better balance the pressure between the accommodating cavity 11 and the valve cavity 12.

In some embodiments, the limiting boss 31 includes a first boss 311 and a second boss 312 which are disposed in a stepped manner, the first boss 311 is disposed corresponding to the first hole 141, and the second boss 312 is disposed corresponding to the second hole 142. The first boss 311 is in interference fit with the first hole 141, and the second boss 312 is in interference fit or transition fit, clearance fit with the second hole 142. In some embodiments, the notch 41 penetrates through the first boss 311 and the second boss 312, so that a gap exists between the limiting boss 31 and the mounting hole, thereby forming the balance channel.

In the present embodiment, a plurality of notches 41 are disposed on a side wall of the guide seat 30, and the plurality of notches 41 are disposed at intervals along a circumferential direction of the limiting boss 31. In some embodiments, two cutting surfaces are disposed on the side wall of the guide seat 30, the two cutting surfaces are disposed on the first boss 311 and the second boss 312 in a penetrating manner, and the cutting surface at two sides are symmetrically disposed at an interval along the circumferential direction of the limiting boss 31. In other embodiments, the number of the notches 41 may vary depending on a use situation, and the number of the notches 41 may be three, four, and five, etc.

As shown in FIGS. 5-10, Embodiment 2 of the present disclosure provides an electronic expansion valve. Embodiment 2 differs from Embodiment 1 in that in Embodiment 2, the guide seat 30 and/or the valve seat 14 have communicating holes 42, one end of each communicating hole 42 is in communication with the accommodating cavity 11, the other end of the each communicating hole 42 is in communication with the valve cavity 12, and the communicating holes 42 form the balance channel 40. In the present embodiment, the communicating hole 42 is disposed on the guide seat 30. In other embodiments, the communicating hole 42 may be disposed on the valve seat 14. In some embodiments, by disposing a cutting groove on an inner wall of the valve seat, the cutting groove can be used to form the balance channel.

Figure 7:
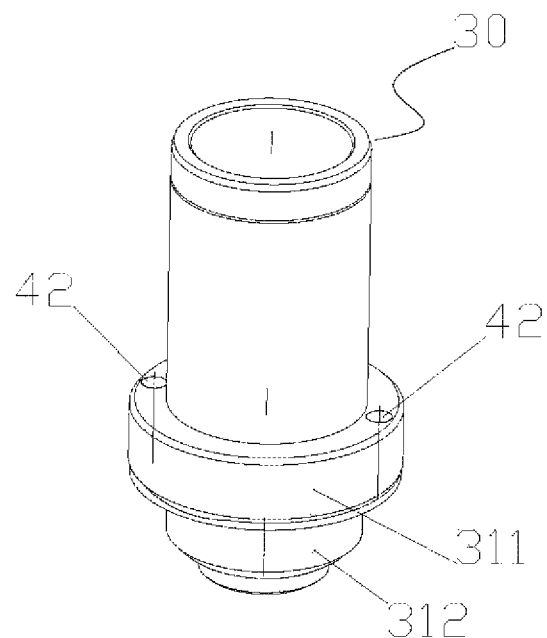
FIG. 7 is a schematic structural diagram of a guide seat in FIG. 5.
Figure 8:
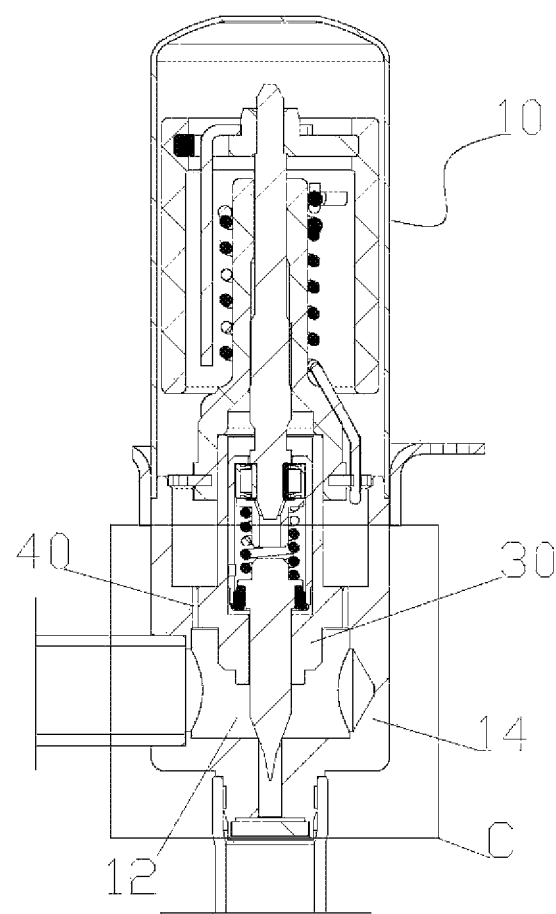
FIG. 8 is another schematic structural diagram of the electronic expansion valve according to Embodiment 2 of the present disclosure.
Figure 9:
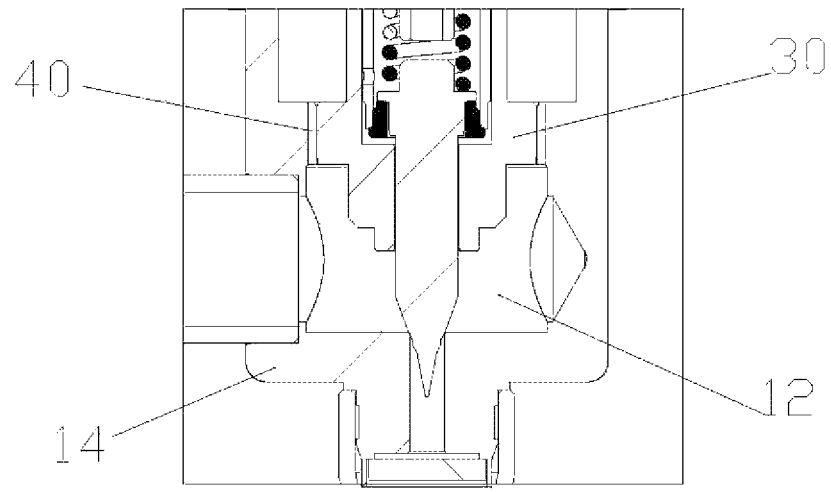
FIG. 9 is a partially enlarged view of C in FIG. 8.

As shown in FIG. 7, the communicating hole 42 is disposed on the limiting boss 31, one end of the communicating hole 42 is in communication with the accommodating cavity 11, and the other end of the communicating hole 42 is in communication with the second hole 142, so that the communicating hole 42 can be in communication with the valve cavity 12 through the second hole 142. In the present embodiment, an outer diameter size of the second boss 312 is smaller than a hole diameter of the second hole 142, so that a gap exists between the second boss 312 and the second hole 142. In some embodiments, one end of the communicating hole 42 is in communication with the accommodating cavity 11, and the other end of the communicating hole 42 is in communication with the valve cavity 12 through the gap between the second boss 312 and the second hole 142.

Figure 10:
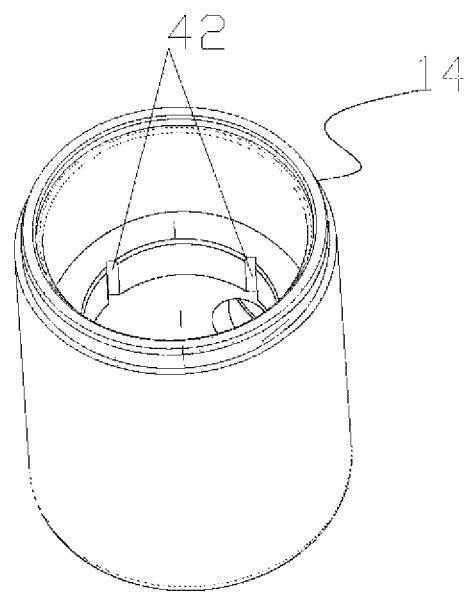
FIG. 10 is a schematic structural diagram of the guide seat in FIG. 8.

As shown in FIG. 10, the communicating hole 42 are disposed on the inner wall of the valve seat 14, and the communicating hole 42 is disposed in the mounting hole in a penetrating manner, so that one end of the communicating hole 42 is in communication with the accommodating cavity 11, and the other end of the communicating hole 42 is in communication with the second hole 142, thereby enabling the communicating hole 42 to be in communication with the valve cavity 12 through the second hole 142.

In the present embodiment, the guide seat 30 has a plurality of communicating holes 42, and the plurality of communicating holes 42 are provided on the limiting boss 31 at intervals along a circumferential direction of the guide seat 30. In some embodiments, the guide seat 30 has two communicating holes 42, and the two communicating holes 42 are symmetrically disposed at an interval along the circumferential direction of the guide seat 30. In other embodiments, the number of the communicating hole 42 may vary depending on an use condition, and the number of the communicating hole 42 may be three, four, and five, etc.

In some embodiments, a nominal diameter of a balance channel at a single side is 0.5 to 3 mm. When the notch 41 is disposed on the side wall of the guide seat 30 provided in Embodiment 1, so that the plurality of notches form the balance channel, an area of a notch at a single side is measured and calculated, and this notch is converted into a round hole having the same area, and at this time, a diameter of the round hole is the nominal diameter of the balance channel at the single side. When the communicating holes 42 are disposed on the guide seat 30 and/or the valve seat 14 provided in Embodiment 2, so that the communicating holes 42 form the balance channel, a diameter of a communicating hole 42 at a single side is the nominal diameter of the balance channel at the single side.

In the present embodiment, the valve core assembly 20 includes a rotor 21, a nut seat 22, a screw 23, and a valve needle assembly 24. The rotor 21 is rotatably disposed in the accommodating cavity, and the nut seat 22 is fixedly disposed in the accommodating cavity. In some embodiments, the rotor 21 is drivingly connected with one end of the screw 23, the valve needle assembly 24 is connected with the other end of the screw 23, the screw 23 is disposed in the nut seat 22 in a penetrating manner, and the screw 23 is in threaded fit with the nut seat 22. When the electronic expansion valve is opened or closed, the rotor 21 rotates in the accommodating cavity, and the rotor 21 drives the screw 23 to rotate relative to the nut seat 22, such that the screw 23 adjusts the relative position between the valve needle assembly 24 and the valve port, thereby achieving the opening or closing of the electronic expansion valve.

One end of the guide seat 30 is connected with the valve seat 14, the other end of the guide seat 30 is connected with the nut seat 22, and an outer circumference of the guide seat 30 is in transition fit or interference fit with an inner hole of the nut seat 22, thereby guiding the nut seat 22, and improving a coaxiality of the nut seat 22 and the valve seat 14. In some embodiments, the guide seat 30 has a connecting segment and a limiting segment that are disposed opposite to each other, and the limiting boss 31 is disposed on the limiting segment. The connecting segment is inserted into the nut seat 22 in an interference fit manner, so as to achieve fixed connection between the guide seat 30 and the nut seat 22. In some embodiments, the guide seat 30 has a guide hole, the guide hole is disposed in the connecting segment, an extension direction of the guide hole is the same as the axial direction of the guide seat 30, and the valve needle assembly 24 is movably disposed in the guide hole. By means of the described structure, the guide seat 30 is disposed between the nut seat 22 and the valve seat 14, and the guide seat 30 can be used to guide the valve needle assembly 24, thereby ensuring a coaxiality between the nut seat 22, the valve needle assembly 24 and the valve seat 14.

The valve needle assembly 24 includes a valve needle and a pretightening spring. A first end of the valve needle is disposed towards the valve port, a second end of the valve needle is connected with the screw 23, the pretightening spring is disposed between the valve needle and the screw 23, and the pretightening spring is used for providing a pretightening force to the valve needle. In some embodiments, when the valve needle abuts against the valve port, the pretightening spring can reduce an impact force between the valve needle and the valve port, and the valve port can be opened under a certain pressure difference when flowing reversely, thereby protecting the valve needle, the valve port and a system.

The notch 41 is disposed on the side wall of the guide seat 30, or the communicating holes 42 are disposed on the guide seat 30 and/or the valve seat 14, so that balance channel 40 is disposed between the accommodating cavity 11 and the valve cavity 12. When the electronic expansion valve is opened or closed, rapid pressure balance between the accommodating cavity 11 and the valve cavity 12 can be achieved by means of the balance channel 40, so that components inside the housing 10 are not damaged, further prolonging the service life of the expansion valve.

The content above only relates to some embodiments of the present disclosure, and is not intended to limit some embodiments of the present disclosure. For a person skilled in the art, some embodiments of the present disclosure can have various modifications and changes. Any modifications, equivalent replacements, improvements and the like made within the principle of the present disclosure shall fall within the scope of protection of the present disclosure.

What is claimed is:

1. An electronic expansion valve, wherein the electronic expansion valve comprises:
    a housing, wherein the housing is provided with an accommodating cavity and a valve cavity, the accommodating cavity is spaced apart from the valve cavity, the valve cavity is used for communicating with a pipeline, the housing comprises a valve seat, and the valve cavity is disposed in the valve seat;
    a valve core assembly, movably disposed in the housing, wherein the valve core assembly has an open position and a blocking position, when the valve core assembly is located in the open position, the valve cavity is in a communication state, and when the valve core assembly is located in the blocking position, the valve cavity is in an isolation state; and
    a guide seat, disposed in the housing, wherein the guide seat is located between the accommodating cavity and the valve cavity, the valve core assembly partially penetrates into the guide seat, a balance channel is provided between the guide seat and the valve seat, a first end of the balance channel is in communication with the accommodating cavity, and a second end of the balance channel is in communication with the valve cavity;
    a limiting boss is disposed on an outer wall of the guide seat, wherein the balance channel comprises a notch, the notch is disposed on a side wall of the limiting boss, and the accommodating cavity is in communication with the valve cavity through the notch; wherein the limiting boss comprises a first boss and a second boss which are disposed in a stepped manner, and the notch penetrates through the first boss and the second boss.

2. The electronic expansion valve as claimed in claim 1, wherein the housing further comprises a sleeve, the valve seat is connected with the sleeve, a mounting hole is disposed at an end, close to the sleeve, of the valve seat, the mounting hole is in communication with the sleeve to form the accommodating cavity, the valve cavity is disposed at the other end of the valve seat, and the guide seat is fixedly connected with the valve seat through the mounting hole.

3. The electronic expansion valve as claimed in claim 2, wherein the mounting hole is a stepped hole, the mounting hole comprises a first hole and a second hole which are sequentially provided and have sequentially decreasing hole diameters, and the second hole is in communication with the valve cavity.

4. The electronic expansion valve as claimed in claim 3, wherein the limiting boss is in interference fit with the first hole, the limiting boss is used for limiting a relative position between the guide seat and the valve seat, and the guide seat penetrates into the first hole and the second hole.

5. The electronic expansion valve as claimed in claim 3, wherein the first boss is disposed corresponding to the first hole, the second boss is disposed corresponding to the second hole.

6. The electronic expansion valve as claimed in claim 1, wherein a plurality of notches are disposed on the side wall of the guide seat, and the plurality of notches are disposed at intervals along a circumferential direction of the limiting boss.

* * * * *